（12）United States Patent
Oran

(10) Patent No.: US 7,542,461 B2
(45) Date of Patent: Jun. 2, 2009

(54) METHOD AND APPARATUS FOR DYNAMICALLY DETERMINING WHEN TO USE QUALITY OF SERVICE RESERVATION IN INTERNET MEDIA APPLICATIONS

(75) Inventor: David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 1121 days.

(21) Appl. No.: 10/828,370

(22) Filed: Apr. 19, 2004

(65) Prior Publication Data

US 2005/0232238 A1    Oct. 20, 2005

(51) Int. Cl.
*H04Q 11/00*    (2006.01)
(52) U.S. Cl. .................. 370/352; 370/468; 370/395.21; 370/411; 709/224; 709/226; 709/227
(58) Field of Classification Search .................. 709/235, 709/240, 227; 370/395.21, 392, 411, 352
See application file for complete search history.

(56) References Cited

U.S. PATENT DOCUMENTS

| 5,953,312 | A | * | 9/1999 | Crawley et al. ............. 370/218 |
| 6,064,653 | A | * | 5/2000 | Farris ......................... 370/237 |
| 6,078,582 | A | * | 6/2000 | Curry et al. ................. 370/356 |
| 6,282,192 | B1 | | 8/2001 | Murphy et al. |
| 2001/0026554 | A1 | * | 10/2001 | Holler et al. ................ 370/401 |
| 2002/0062379 | A1 | * | 5/2002 | Widegren et al. ........... 709/227 |
| 2002/0133600 | A1 | * | 9/2002 | Williams et al. ............ 709/228 |
| 2003/0035401 | A1 | * | 2/2003 | Shaheen et al. ............. 370/341 |
| 2003/0202506 | A1 | | 10/2003 | Perkins et al. |

* cited by examiner

*Primary Examiner*—Curtis Kuntz
*Assistant Examiner*—Phung-Hoang J Nguyen
(74) *Attorney, Agent, or Firm*—Stolowitz Ford Cowger LLC

(57) ABSTRACT

A call controller is configured to monitor call signaling for a media call between a first and second endpoint. The call controller dynamically determines when to insert a media proxy into a media session for the call according to a relationship in network topology between the first and second endpoint.

26 Claims, 6 Drawing Sheets

METHOD AND APPARATUS FOR DYNAMICALLY DETERMINING WHEN TO USE QUALITY OF SERVICE RESERVATION IN INTERNET MEDIA APPLICATIONS

BACKGROUND

Resource reservation and call admission control are important facilities to provide in any Internet Protocol (IP) telephony, video conferencing, or Internet multimedia application. Without such facilities, the applications can fail in the presence of Quality of Service (QoS) problems.

The solution to these problems usually involves explicit reservation/admission control signaling by endpoints of the media sessions, through a signaling protocol like Resource Reservation Protocol (RSVP) or the emerging Next Steps In Signaling (NSIS) protocol.

Unfortunately, not all endpoints support these protocols. In order to ameliorate the crippling effects of not having bandwidth reservation or admission control in these cases, Media Transfer Points (MTPs) and admission control proxies have been developed which act on behalf of endpoints lacking the necessary QoS signaling protocols.

These band-aids help, but have a number of disadvantages, chief among them being decreased robustness because there is now a stateful intermediary in the media path between the endpoints. Another disadvantage is higher resource usage because the media traffic no longer flows on the optimal path between the endpoints, and because extra processing is needed to perform the media transfer point functions. In addition, the MTP can easily become a "hot spot" and create QoS problems where they would otherwise not exist.

The present invention addresses this and other problems associated with the prior art.

SUMMARY OF THE INVENTION

A call controller is configured to monitor call signaling for a media call between a first and second endpoint. The call controller dynamically determines when to insert a media proxy into a media path for the call according to a relationship in network topology between the first and second endpoint.

The foregoing and other objects, features and advantages of the invention will become more readily apparent from the following detailed description of a preferred embodiment of the invention which proceeds with reference to the accompanying drawings.

DETAILED DESCRIPTION

The need for a QoS intermediary device is dynamically determined based on the network topology relationship between call endpoints. The intermediary device is inserted in the media session to request proper admission control and Quality of Service (QoS) behavior on behalf of the endpoint. No intermediary device is inserted when the network topology relationship between the endpoints indicates that proper admission control or QoS can be achieved without reservation through the intermediary device.

Figure 1:
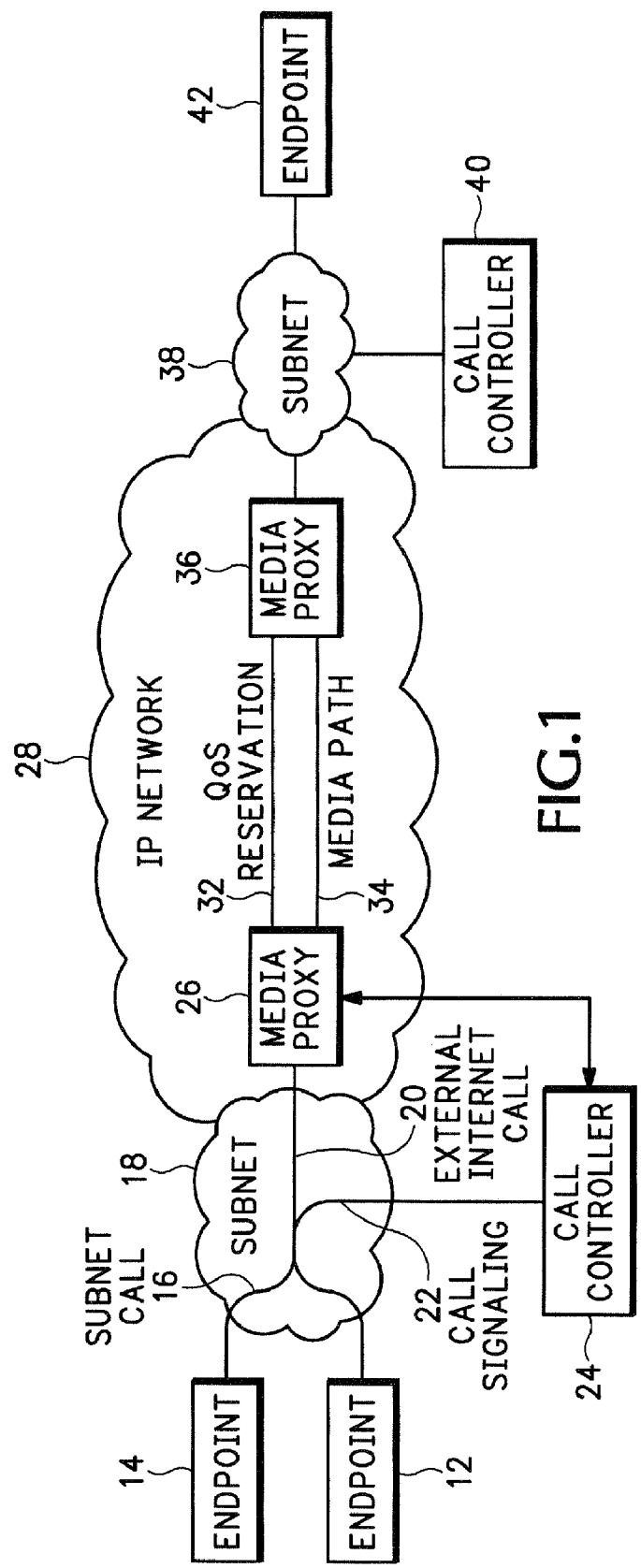
FIG. 1 is a block diagram of a network that dynamically determines when to insert a media proxy in a media session.

Referring to FIG. 1, a Wide Area Network (WAN) includes endpoints 12 and 14 coupled through a subnet 18 to the rest of an Internet Protocol (IP) network 28. Another subnet 38 connects another endpoint 42 at some other location in the IP network 28.

The endpoints 12, 14, and 42 can be any device used for sending or receiving a media stream. For example, the endpoints can include a Voice Over IP (VoIP) phone, a conventional analog phone coupled to the network via a gateway (not shown), a computer, an audio or video server, or any other device that may need to either send or receive audio, video or any other type of media stream.

The subnets 18 and 38 in one embodiment refer to a portion of a network that shares a common address component. However, the subnets 18 and 38 can also refer to a same Local Area Network (LAN), endpoints within some common geographical area, a common set of endpoints that are serviced by a common network device, or any other network topology relationship that may affect QoS.

One of the endpoints, such as endpoint 12, may direct a call to endpoint 42 located at another location in Internet 28. Since the media path 34 between endpoint 12 and endpoint 42 has to travel over the IP network 28, it may be necessary to provide a QoS reservation for the media session. However, the endpoint 12 or the endpoint 42, or both, may not support a QoS reservation protocol, such as RSVP.

A call controller 24 monitors the call signaling 22 used by the endpoints 12, 14, and 42 for establishing the media session. For example, the call signaling may include SIP, H.323, H.225, H.245, or any other signaling used for establishing a media stream between two or more endpoints.

The call controller 24 identifies endpoints that do not support a Quality of Service (QoS) reservation protocol and uses a media proxy 26 to conduct the QoS reservation on behalf of the endpoint. The media proxy 26 can be any media transfer point, Real Time Transport Protocol (RTP) mixer/translator, Resource Reservation Setup Protocol (RSVP) proxy, media gateway, or any network processing device used for reserving network resources.

The media proxy 26 and the call controller 24 are shown as separate network processing devices for explanation purposes, but could alternatively be in the same network processing device or could be incorporated in other switches, routers, gateways, etc. in the network.

The media proxy 26 in one situation may conduct the QoS reservation 32 directly with a destination endpoint, such as endpoint 42. Otherwise, the media proxy 26 may conduct the QoS reservation 32 with another media proxy 36 that conducts the QoS reservation on behalf of endpoint 42. After the QoS reservation 32 is established, the two endpoints start sending media over media path 34.

Using a media proxy on behalf of an endpoint to reserve network resources is described in co-pending application Ser. No. 09/415,952 entitled METHOD AND APPARATUS FOR GENERATING AN RSVP MESSAGE FOR A NON-RSVP-ENABLED NETWORK DEVICE filed Oct. 8, 1999 and Ser. No. 09/940,753 entitled RSVP TRANSMITTER PROXY filed Aug. 28, 2001 which are herein incorporated by reference.

In another example, the endpoint 12 may make a call to another endpoint 14 in a same general geographical or network vicinity. For example, endpoints 12 and 14 may be located in the same building, or if not located in the same building, may be connected to the same subnet, router, switch, gateway, etc.

In this situation, it may not be necessary to conduct QoS reservation prior to establishing the media session between endpoints 12 and 14. Since the two endpoints 12 and 14 are connected through one or a few network processing devices, it is less likely that bandwidth problems will occur.

Dynamic Media Proxy Insertion

Figure 2:
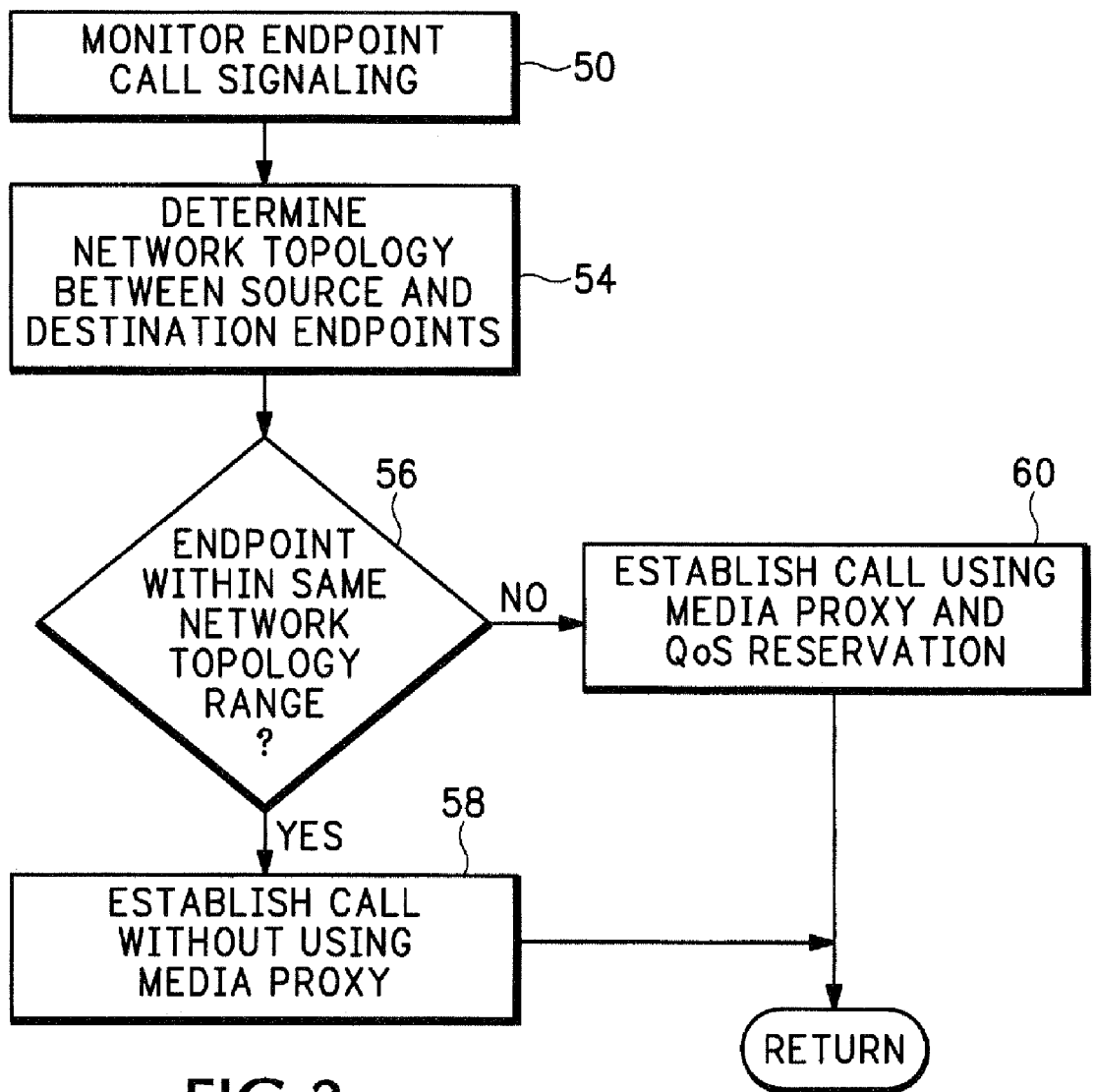
FIG. 2 is a flow diagram describing in more detail how a call controller determines when to insert the media proxy.

The call controller 24 dynamically determines whether or not to insert the media proxy 26 in the media session according to the network topology relationship between the media session endpoints. Referring to FIGS. 1 and 2, the call controller 24 monitors signaling 22 for the source endpoint in block 50 and determines a relative network topology between the source endpoint and the destination endpoint in block 54.

The call controller 24 determines whether the two endpoints are within the same network topology range in decision block 56. If the two endpoints are not within the same range, the call controller 24 inserts the media proxy 26 into the call path in block 60. The media proxy 26 then conducts a QoS reservation on behalf of the endpoints to ensure satisfactory call transport over the media path 34.

If the destination endpoint, such as endpoint 42, supports the QoS reservation protocol 32, then the media proxy 26 may conduct the QoS reservation directly with endpoint 42. Alternatively, the media proxy 26 may conduct the QoS reservation with another media proxy 36 that operates on behalf of the destination endpoint 42. A media stream for the call 20 between the two endpoints is then passed through the media path 34 established through the media proxy 26.

If the two endpoints are within the same network range in block 56, the call controller 24 does not insert the media proxy 26 into the media session in block 58. Since the two endpoints have a relatively close network proximity, it is likely that a satisfactory media exchange can be conducted without first having to use the media proxy for a QoS reservation. The two endpoints, for example, endpoints 12 and 14, then conduct the media session 16 without going through media proxy 26.

The example above refers to a media call between a source endpoint and a destination endpoint. But it should be understood that the dynamic media proxy insertion can also be used for calls between more than two endpoints. For example, a conference call may be initiated between more than two endpoints. If the call controller determines two or more of the multiple endpoints in the conference call are outside of the same network topology range, a media proxy is inserted between the endpoints. If all of the endpoints are within the same network range, then no media proxy is used.

Subnets

Figure 3:
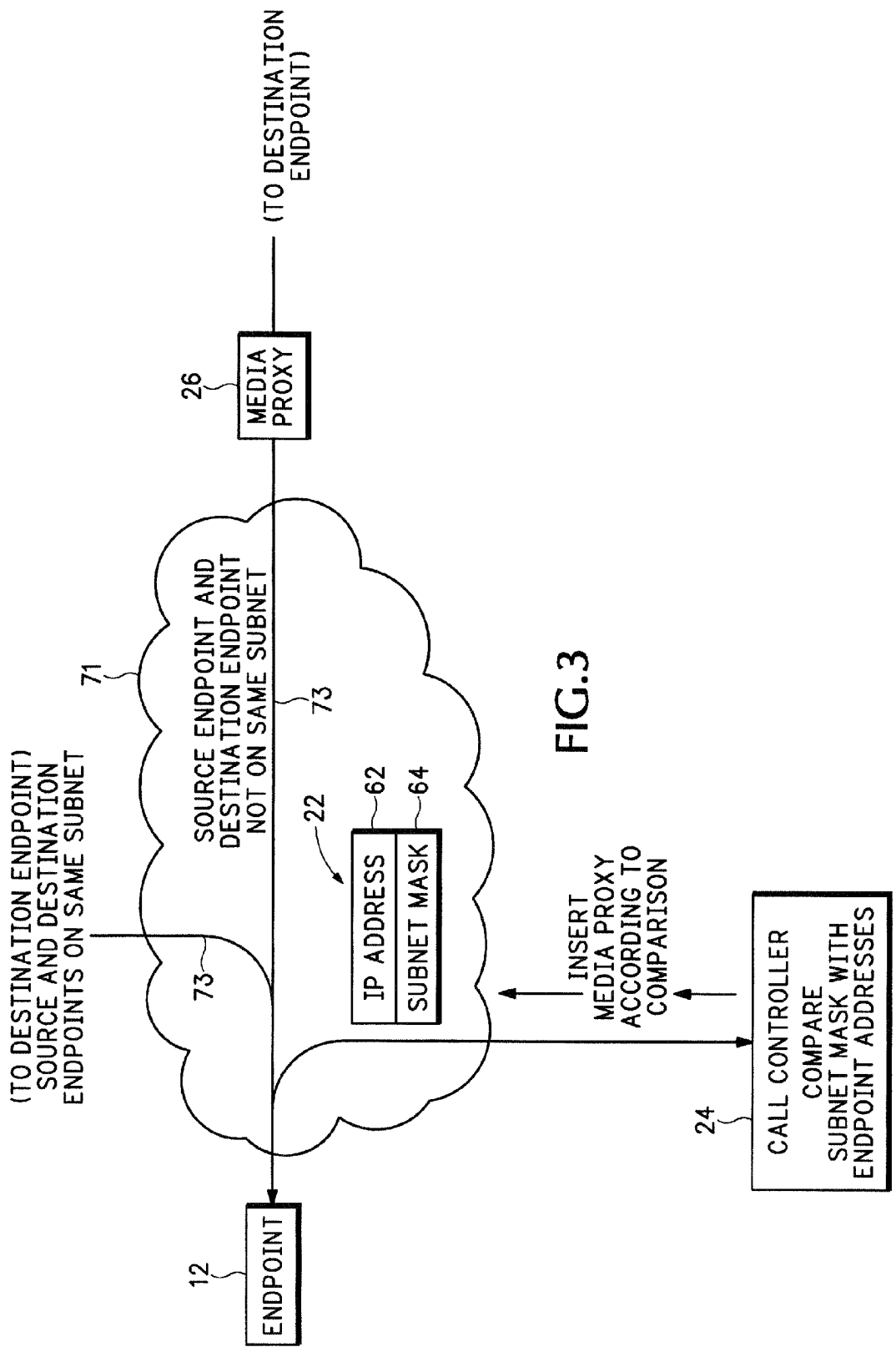
FIG. 3 is a diagram showing one example of how to identify endpoints on a same subnet.

FIG. 3 shows one example of how the call controller 24 determines whether or not the two endpoints for the media session are within the same network topology range. In this example, the call controller 24 monitors call signaling 22 from the endpoint 12 over IP network 71. The call signaling can use any IP based call signaling protocol including Session Initiation Protocol (SIP), skinny client control protocol (SCCP), H.323, H.225/H.245, etc.

The call signaling 22 includes the IP addresses 62 for the source endpoint 12 and the destination endpoint. The call signaling may not come directly from the endpoint 12, but could alternatively come through a gateway or call manager that converts telephone numbers into the IP addresses 62. In the embodiment shown in FIG. 3, the call signaling 22 also includes a subnet mask 64. The subnet mask is known to those skilled in the art and is typically used to determine what subnet an IP address belongs to.

The call controller 24 applies both the source and destination IP addresses 62 to the subnet mask 64. If the significant bits of the two IP addresses match after being applied to the subnet mask, the two endpoints are determined to be within a same subnet. In this situation, no media proxy 26 is inserted into a call path 73. If the two addresses 62 are not within the same subnet, then the media proxy is inserted into a call path 73.

The subnet mask comparison is described below in further detail. An IP address has two components, the network address and the host address. For example, consider the IP address 150.215.017.009. Assuming this is part of a Class B network, the first two numbers (150.215) represent a Class B network address, and the second two numbers (017.009) identify a particular host on the network. If this network is divided into 14 subnets, however, then the first 4 bits of the host address (0001) are reserved for identifying the subnet.

The subnet mask is the network address plus the bits reserved for identifying the subnetwork. In this case, therefore, the subnet mask would be 11111111.11111111.11110000.00000000. The subnet mask is used to identify the subnet to which an IP address belongs by performing a bitwise AND operation on the mask and the IP address. The result is the subnetwork address:

| | | |
|---|---|---|
| Subnet Mask | 255.255.240.000 | 11111111.11111111.11110000.00000000 |
| IP Address | 150.215.017.009 | 10010110.11010111.00010001.00001001 |
| Subnet Address | 150.215.016.000 | 10010110.11010111.00010000.00000000 |

The subnet address for IP address 150.215.017.009 is therefore 150.215.016.000. If the IP addresses 62 for the two endpoints have the same subnet address, then the media proxy 26 is not inserted into the call path 73 between the two endpoints.

Figure 4:
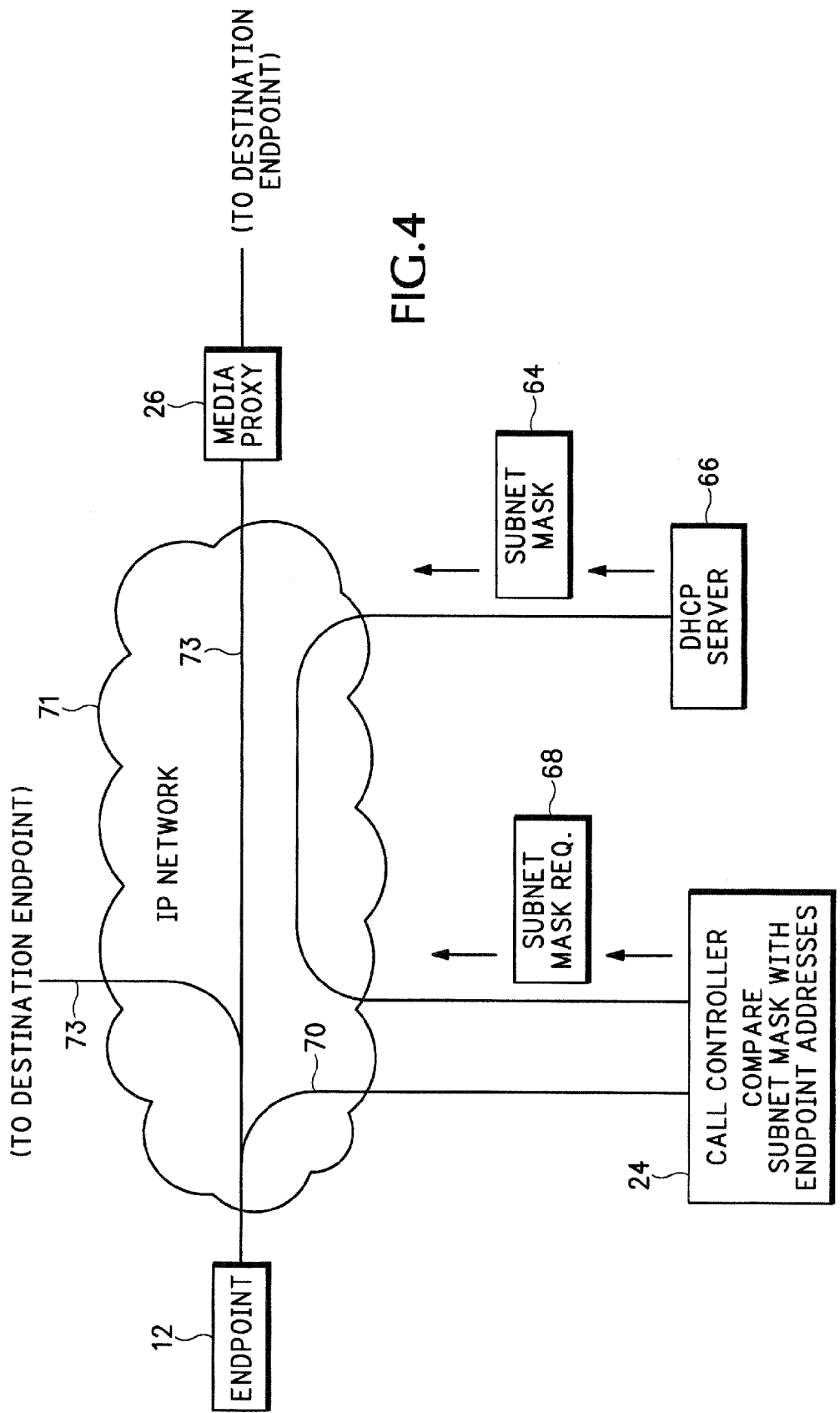
FIG. 4 is a diagram showing another example of how to identify endpoints on a same subnet.

FIG. 4 shows an alternative embodiment where the call controller 24 queries a Dynamic Host Configuration Protocol (DHCP) server 66 for the subnet mask 64. The DHCP/DHCPv6 server 66 assigns dynamic IP addresses to devices on IP network 71. The DHCP server 66 can be any network processing device that provides the subnet mask 64.

The call controller 24 makes a subnet mask request 68 to the DHCP server 66. The call controller 24 can make the subnet mask request 68 periodically or can make the subnet mask request pursuant to receiving call signaling 70 from the endpoint 12.

The call controller 24 applies the subnet mask 64 to the IP addresses received in the call signaling 70 in the same manner described above in FIG. 3. If the two IP addresses have the same subnet address, the call controller 24 does not insert the media proxy 26 into the call path 73. If the two endpoint addresses do not have the same subnet address, the media proxy 26 is inserted into the call path 73 between the two endpoints.

There are several ways that the call controller 24 can identify the DHCP server 66 for requesting the subnet mask 64. One way to identify the DHCP server 66 is to take the IP address for the endpoint and feed it into a reverse DNS lookup map. The name of the DHCP server responsible for the subnet containing the endpoint IP address is input into the reverse DNS lookup map. A DNS lookup provides the IP address for the DHCP server. A query is than made to the DHCP IP address requesting the subnet mask 64.

Multiple Subnet Range

It may be determined that a media proxy is not required when the two endpoints are within a certain group of subnets. Even though the two endpoints are not on the same subnet, the network topology may be such that QoS reservation is not necessary within a particular group of subnet addresses.

The call controller 24 can modify the bits in the received subnet mask 64 to increase the range of IP addresses that will generate a same subnet address. Alternatively, the call controller 24 can compare the subnet addresses for the source and destination endpoints. No media proxy is inserted for any subnet addresses within a predetermined subnet address range. A media proxy is used for subnet addresses outside of the subnet address range.

Routing Metrics

Figure 5:
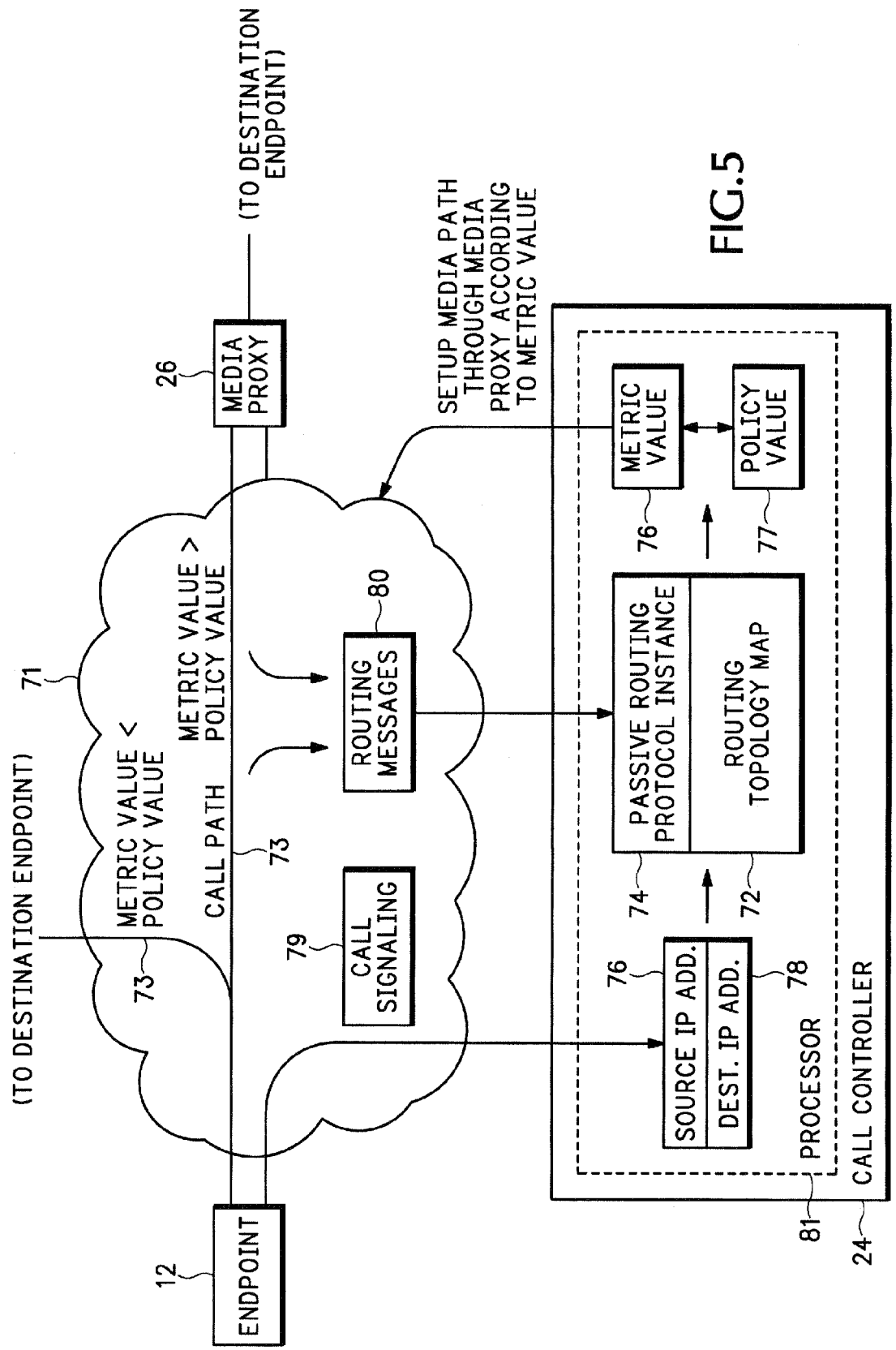
FIG. 5 is a diagram showing another embodiment of the call controller that inserts a media proxy into a media session according to a routing metric value.

FIG. 5 shows another embodiment where the call controller 24 uses a routing metric to determine when to insert the media proxy 26 into call path 73. The call controller 24 includes a processor 81 that operates a routing protocol in passive or "quiet" mode 74 that passively listens for routing messages 80 sent over the IP network 71. The passive instance of routing protocol 74 uses the routing messages 80 to update a routing map 72. The endpoint IP addresses 76 and 78 are applied to the routing map 72 to generate a metric value 76. The metric value 76 is then used to dynamically determine when to insert the media proxy 26 into the path 73.

Typically, a routing protocol uses metric values generated from a routing map to compute an optimal path consisting of a sequence of links over which packets are forwarded. However, the call controller 24 provides the novel operation of using the metric value 76 to determine when to insert media proxy 26 into call path 73. The routing protocols used in the passive routing protocol instance 74 can include any existing link state routing protocol such as Open Shortest Path First (OSPF) or Intermediate System to Intermediate System (IS-IS). Since these routing protocols are known to those skilled in the art, they are not explained in further detail.

Figure 6:
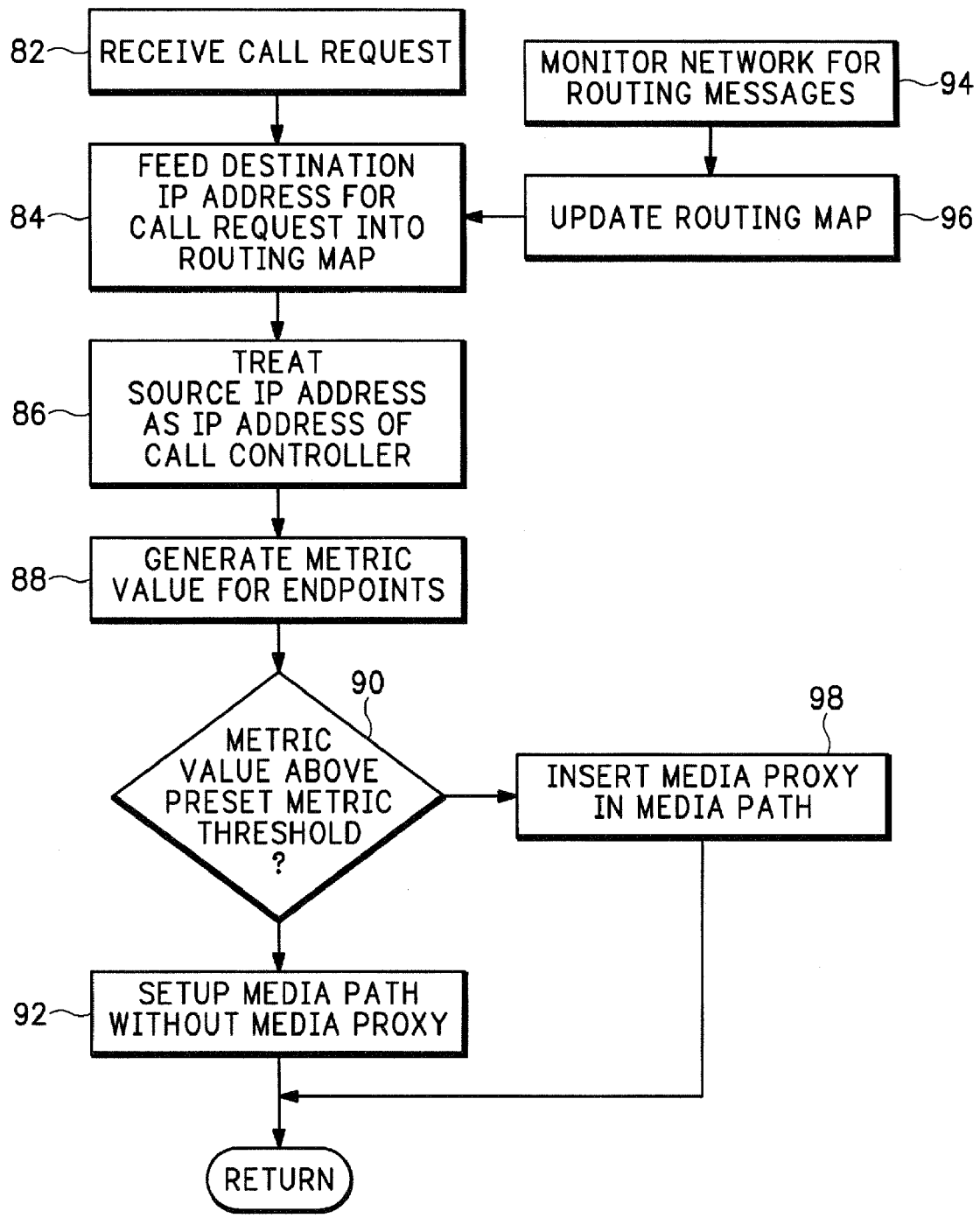
FIG. 6 is a flow diagram showing functions performed by the call controller in FIG. 5.

Referring both to FIGS. 5 and 6, the routing protocol 74 is a conventional link state routing protocol operating in block 94 in a passive or "quiet" mode. Operating in a quiet mode means the routing protocol 74 listens passively to routing messages 80 and updates the conventional routing map 72 in block 96 as if it were actually going to route packets. The routing map 72 shows every node and every link in an associated area of IP network 71. A metric value is associated with every link identified in the routing map 72.

In block 82 the call controller receives call signaling from endpoint 12. The call signaling 79 includes a source IP address 76 and a destination IP address 78. The destination endpoint IP address 76 is fed into the routing map 72 in block 84. The call controller 24 in block 86 treats the source endpoint IP address 76 as its own local IP address when applying the destination IP address 76 to the routing map 72. The call controller 24 then determines the shortest path to the destination IP address 78.

The shortest path is not really needed. But a total metric value 76 for all the links in the shortest path to the destination IP address 78 is generated during the shortest path computation in block 88. This generated metric value 76 is compared with a policy value 77 in block 90. The policy value 77 is a predetermined empirically generated value stored in the call controller 24 that defines a threshold for either inserting or not inserting the media proxy 26.

If the metric value 76 generated by the routing map 72 is above the policy value 77, the media proxy 26 is inserted into the call path 73 in block 98. If the metric value is below the policy value 77, the media proxy is not inserted into the call path in block 92. This has the desired effect because the metric threshold conventionally represents an upper bound of the cost of the path between the two endpoints above which QoS treatment is necessary in order to provide acceptable performance.

Endpoints Supporting QoS Reservation Protocols

In the embodiments described above one or more of the endpoints do not support a QoS reservation protocol. Therefore, the media proxy 26 is selectively inserted into the call path to conduct the QoS reservation on behalf of the endpoint. In another embodiment, endpoint topology is analyzed for endpoints that support QoS reservation protocols.

The call controller, or the endpoints themselves, can conduct the network topology analysis between the source and destination endpoints as described above. However, the endpoints already support a QoS reservation protocol. Therefore, the results of the topology analysis do not determine whether or not a media proxy is inserted into the call path. Alternatively, the results of the network topology analysis dynamically determines whether or not the endpoints themselves will conduct the QoS reservation. This eliminates unnecessary reservation signaling between endpoints that support QoS reservation protocols.

The invention described above avoids the robustness problems of a stateful intermediary in cases where it is not necessary. Dynamic media proxy assignment also avoids the resource usage, performance, and possible QoS problems of a media transfer point in cases where it is not necessary.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiments thereof, it should be apparent that the invention may be modified in arrangement and detail without departing from such principles. I claim all modifications and variation coming within the spirit and scope of the following claims.

The invention claimed is:

1. A call controller, comprising:
    a processor configured to monitor call signaling for a media call between a first endpoint and a second endpoint and dynamically determine whether or not to selectively insert a media proxy into a call path associated with the call signaling according to a network proximity between the first and second endpoints;
    wherein the network proximity corresponds with a network topology relationship of the first endpoint and the second endpoint; and
    wherein the processor is further configured to:
    identify when the first endpoint does not adequately support a quality of service reservation protocol;

cause the media proxy to conduct a quality of service reservation for the call path on behalf of the first endpoint when the first endpoint is identified as not supporting the quality of service reservation protocol and the first and second endpoints are outside of a given network proximity range; and cause the call path to be established without the media proxy and without conducting a quality of service reservation when the first and second endpoints are within the given network proximity range.

2. The call controller according to claim 1 wherein the processor determines the network proximity by applying Internet Protocol (IP) addresses for the first and second endpoints to a subnet mask.

3. The call controller according to claim 2 wherein the processor receives the subnet mask in the monitored call signaling, the processor not inserting the media proxy into the call path when the first and second endpoints have a same subnet address and inserting the media proxy into the media path when the first and second endpoints do not have the same subnet address.

4. The call controller according to claim 2 wherein the processor requests the subnet mask from an IP address assignment server.

5. The call controller according to claim 1 wherein the processor generates a routing metric value by applying Internet Protocol (IP) addresses for the first and second endpoints to a routing map and uses the routing metric value to determine the network proximity between the first and second endpoints.

6. The call controller according to claim 5 wherein the processor operates according to a passive router protocol receiving routing messages and using the received routing messages to update the routing map without ever using the routing map to route IP packets between the first and second endpoints.

7. The call controller according to claim 6 wherein the processor inserts the media proxy into the call path when the routing metric value is above a predetermined policy value and does not insert the media proxy into the call path when the routing metric value is below the predetermined policy value.

8. A network device, comprising:
a call controller monitoring a first endpoint sending call signaling, wherein the call controller selectively causes quality of service reservation for a media path between the first endpoint and a second endpoint on behalf of at least one of the first endpoint and second endpoint according to a network proximity of the first endpoint with the second endpoint when the network proximity between the first and second endpoints indicate that proper quality of service reservation cannot be achieved and selectively not causing quality of service reservation for the media path on behalf of at least one of the first and second endpoints when the network proximity between the first and second endpoints indicate that proper quality of service reservation can be achieved, the network proximity corresponding to a network topology relationship of the first endpoint and the second endpoint; and
wherein the call controller is further configured to determine the network proximity by applying Internet Protocol (IP) addresses for the first and second endpoints to a subnet mask and not use quality of service reservation for the media path when the first and second endpoints have a same subnet address and use the quality of service reservation for the media path when the first and second endpoints do not have the same subnet address.

9. The network device according to claim 8 wherein the call signaling causes a media proxy to be inserted in the media path for performing the quality of service reservation according to the network proximity of the first and second endpoints.

10. The network device according to claim 8 wherein the first endpoint sends the subnet mask along in the call signaling that is used to determine the network proximity between the first and second endpoints.

11. The network device according to claim 8 wherein the quality of service reservation is performed according to a routing protocol metric generated from the Internet Protocol (IP) addresses associated with the first and second endpoints.

12. A method for establishing a media stream over a packet switched network, comprising:
dynamically deciding whether to insert a Quality of Service (QoS) intermediary into a media session between two endpoints according to a relative proximity of the two endpoints in the packet switched network;
identifying when at least one of the endpoints does not support a quality of service reservation protocol;
inserting the QoS intermediary into the media session for conducting a quality of service reservation for the media session on behalf of the identified at least one of the endpoints when the at least one of the endpoints is identified as not supporting the quality of service reservation protocol and the two endpoints are outside of a relative network proximity range; and
allowing the media session to be established without inserting the QoS intermediary into the media session when the first and second endpoints are within the relative network proximity range.

13. The method according to claim 12 including inserting the intermediary into the media session according to subnet addresses associated with the two endpoints.

14. The method according to claim 13 including:
identifying a range of the subnet addresses; and
inserting the intermediary into the media session when the subnet addresses associated with the two endpoints are within the identified subnet address range.

15. The method according to claim 12 wherein the dynamically deciding whether to insert the intermediary into the media session is according to a routing metric associated with the two endpoints.

16. The method according to claim 12 including:
passively listening for routing messages sent over the packet switched network;
using the routing messages to update a routing map;
using an Internet Protocol (IP) address for a first one of the endpoints as a local IP address associated with the routing map;
generating a routing metric associated with a shortest path between the first and a second endpoint by applying the IP address for the second one of the endpoints to the routing map; and
selectively inserting the intermediary into the media session according to the generated routing metric.

17. A system for establishing a media stream over a packet switched network, comprising:
means for dynamically deciding whether to insert a Quality of Service (QoS) intermediary into a media session between two endpoints according to a relative proximity of the two endpoints in the packet switched network;
means for identifying when at least one of the two endpoints does not adequately support a quality of service reservation protocol;
means for inserting the QoS intermediary into the media session on behalf of the identified at least one of the two endpoints when the at least one of the endpoints is identified as not supporting the quality of service reservation protocol and the two endpoints are outside of a given network proximity range, and means for allowing the media session to be established without inserting the QoS intermediary into the media session on behalf of the identified at least one of the two endpoints when the two endpoints are within the given network proximity range.

18. The system according to claim 17 including means for inserting the intermediary into the media session according to subnet addresses associated with the two endpoints.

19. The system according to claim 18 including:
means for identifying a range of the subnet addresses; and
means for inserting the intermediary into the media session when the subnet addresses associated with the two endpoints are within the identified subnet address range.

20. The system according to claim 17 wherein the means for dynamically deciding whether to insert the intermediary into the media session operates according to a routing metric associated with the two endpoints.

21. The system according to claim 17 including:
means for passively listening for routing messages sent over the packet switched network;
means for using the routing messages to update a routing map;
means for using an Internet Protocol (IP) address for a first one of the endpoints as a local IP address associated with the routing map;
means for generating a routing metric associated with a shortest path between the first and a second endpoint by applying the IP address for the second one of the endpoints to the routing map; and
means for selectively inserting the intermediary into the media session according to the generated routing metric.

22. An electronic storage medium containing software for establishing a media stream over a packet switched network, the software contained in the electronic storage medium when executed comprising:
dynamically deciding whether to insert a Quality of Service (QoS) intermediary into a media session between two endpoints according to a relative proximity of the two endpoints in the packet switched network;
identifying at least one of the two endpoints that does not support a quality of service reservation protocol;
inserting the QoS intermediary into the media session for conducting a quality of service reservation for the media session on behalf of the identified at least one of the two endpoints when the two endpoints are outside of a network proximity range and the at least one of the endpoints is identified as not supporting the quality of service reservation protocol; and
allowing the media session to be established without inserting the QoS intermediary into the media session when the two endpoints are within the network proximity range.

23. The electronic storage medium according to claim 22 including inserting the intermediary into the media session according to subnet addresses associated with the two endpoints.

24. The electronic storage medium according to claim 23 including:
identifying a range of the subnet addresses; and
inserting the intermediary into the media session when the subnet addresses associated with the two endpoints are within the identified subnet address range.

25. The electronic storage medium according to claim 22 wherein the dynamically deciding whether to insert the intermediary into the media session is according to a routing metric associated with the two endpoints.

26. The electronic storage medium according to claim 22 including:
passively listening for routing messages sent over the packet switched network;
using the routing messages to update a routing map;
using an Internet Protocol (IP) address for a first one of the endpoints as a local IP address associated with the routing map;
generating a routing metric associated with a shortest path between the first and second endpoint by applying the IP address for a second one of the endpoints to the routing map; and
selectively inserting the intermediary into the media session according to the generated routing metric.

* * * * *